US012596032B2

(12) United States Patent
Teo et al.

(10) Patent No.: US 12,596,032 B2
(45) Date of Patent: Apr. 7, 2026

(54) OPTICAL DETECTION DEVICE, SYSTEM, AND METHOD FOR OMNIDIRECTIONAL PHOTODETECTION

(71) Applicant: Agency for Science, Technology and Research, Singapore (SG)

(72) Inventors: Ee Jin Teo, Singapore (SG); Chi Jin Darren Neo, Singapore (SG); Min Xin Maxine Ong, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 81 days.

(21) Appl. No.: 18/705,721

(22) PCT Filed: Oct. 25, 2022

(86) PCT No.: PCT/SG2022/050761
§ 371 (c)(1),
(2) Date: Apr. 29, 2024

(87) PCT Pub. No.: WO2023/086015
PCT Pub. Date: May 19, 2023

(65) Prior Publication Data
US 2024/0426659 A1     Dec. 26, 2024

(30) Foreign Application Priority Data

Nov. 11, 2021    (SG) ............................ 10202112542P

(51) Int. Cl.
*G01J 3/02*          (2006.01)
*G01J 3/12*          (2006.01)
(Continued)

(52) U.S. Cl.
CPC ........... *G01J 3/0251* (2013.01); *G01J 3/0208* (2013.01); *G01J 3/4406* (2013.01); *G01J 3/4412* (2013.01);
(Continued)

(58) Field of Classification Search
CPC ...... G01J 3/0251; G01J 3/0208; G01J 3/4406; G01J 3/4412; G01J 3/4338;
(Continued)

(56) References Cited

U.S. PATENT DOCUMENTS

| | | | | |
|---|---|---|---|---|
| 5,268,749 A | * | 12/1993 | Weber .................... | G02B 13/24 359/387 |
| 2004/0073120 A1 | * | 4/2004 | Motz ........................ | A61B 1/07 600/478 |

(Continued)

FOREIGN PATENT DOCUMENTS

WO          2020225195 A1     11/2020

OTHER PUBLICATIONS

Jul. 4, 2023 (PCT) International Search Report and Written Opinion— App. PCT/SG2022/050761.

*Primary Examiner* — Tarifur R Chowdhury
*Assistant Examiner* — Akbar H. Rizvi
(74) *Attorney, Agent, or Firm* — Banner & Witcoff, Ltd.

(57)                ABSTRACT

Disclosed are optical detection device, system, and method which increase photodetection area and enables omnidirectional and self-aligning photodetection through the use of a fluorescent lens. An optical detection device comprises a fluorescent lens having a light collecting area being a spherical, hemispherical, or cylindrical surface of the fluorescent lens, and a light outcoupling area; and a fluorophore dispersed throughout the light collection area and the fluorescent lens, wherein the fluorophore is excitable by a light beam, which is incident at any position or angle in relation to the spherical surface, to produce a light emission, wherein the light outcoupling area is arranged to allow an extraction of the light emission from the fluorescent lens, wherein the light collecting area is larger than the light outcoupling area.

23 Claims, 4 Drawing Sheets

(51) Int. Cl.
  *G01J 3/42* (2006.01)
  *G01J 3/433* (2006.01)
  *G01J 3/44* (2006.01)
(52) U.S. Cl.
  CPC . *G01J 2003/1213* (2013.01); *G01J 2003/423*
      (2013.01); *G01J 3/4338* (2013.01)
(58) Field of Classification Search
  CPC ........ G01J 2003/1213; G01J 2003/423; H04B
      10/112; H04B 10/67
  See application file for complete search history.

(56)                References Cited

U.S. PATENT DOCUMENTS

2007/0038120 A1    2/2007  Richards-Kortum et al.
2010/0165339 A1    7/2010  Morgan et al.
2019/0197294 A1*   6/2019  Demirci ............... G06V 20/693
2020/0012121 A1*   1/2020  Wang ................. G01N 21/6458

* cited by examiner

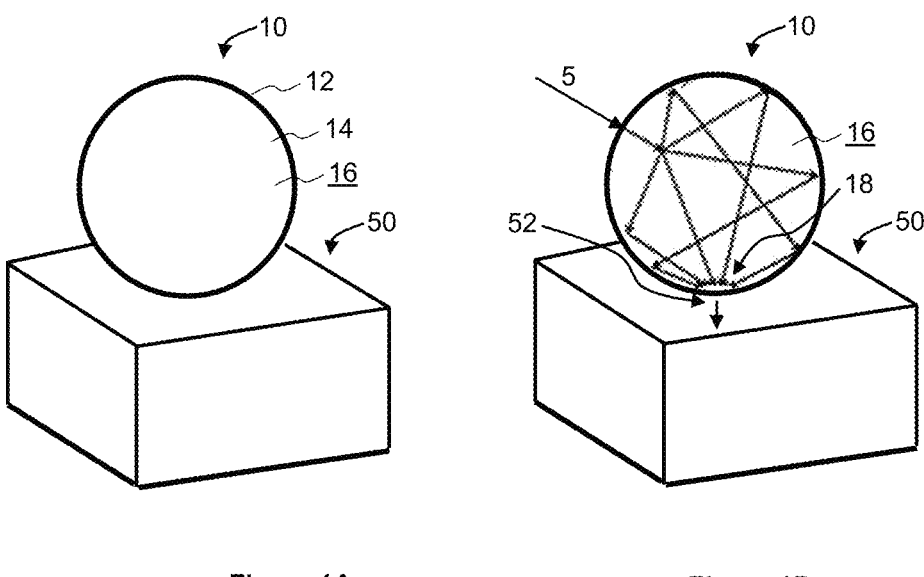

Figure 1A            Figure 1B

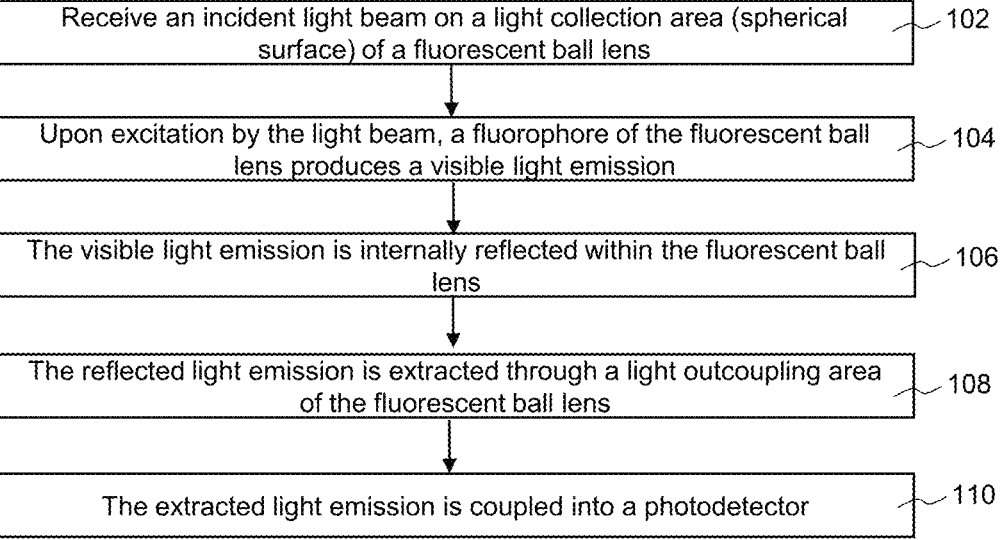

| |
|---|
| Receive an incident light beam on a light collection area (spherical surface) of a fluorescent ball lens — 102 |
| Upon excitation by the light beam, a fluorophore of the fluorescent ball lens produces a visible light emission — 104 |
| The visible light emission is internally reflected within the fluorescent ball lens — 106 |
| The reflected light emission is extracted through a light outcoupling area of the fluorescent ball lens — 108 |
| The extracted light emission is coupled into a photodetector — 110 |

Figure 1C

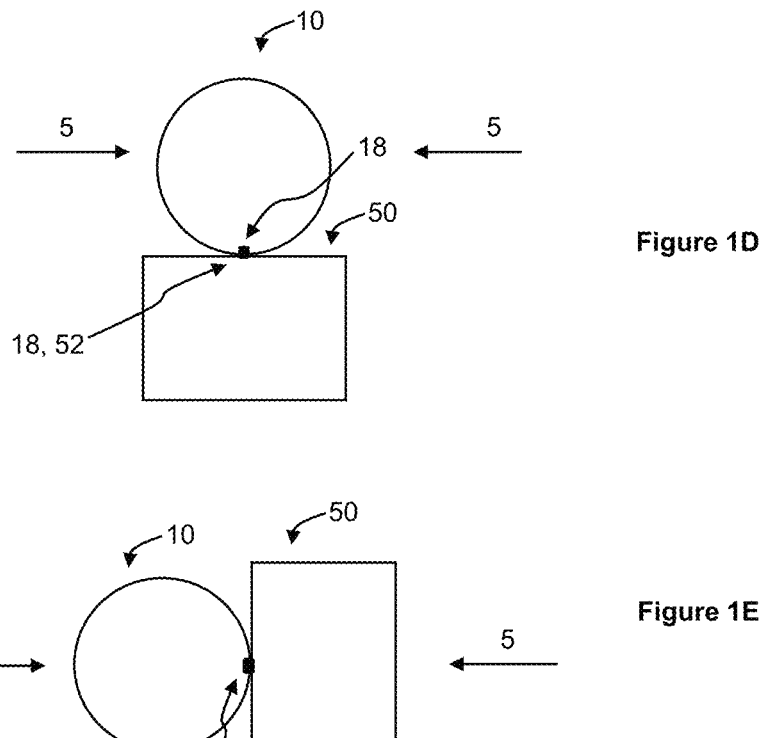
Figure 1D
Figure 1E
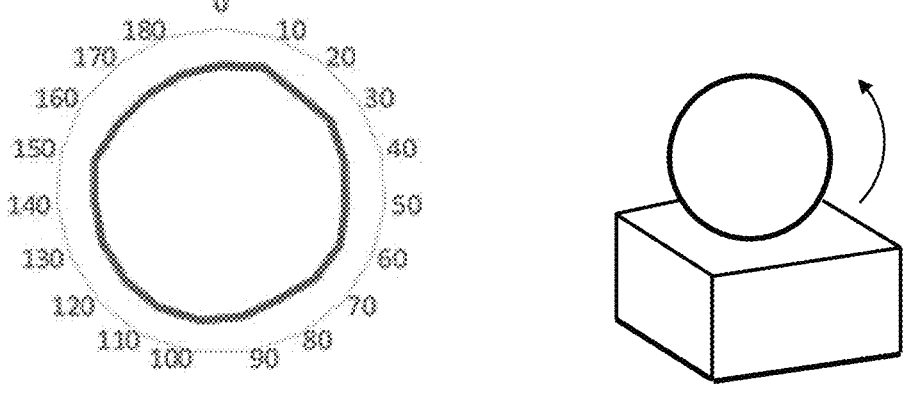
Figure 2A                    Figure 2B

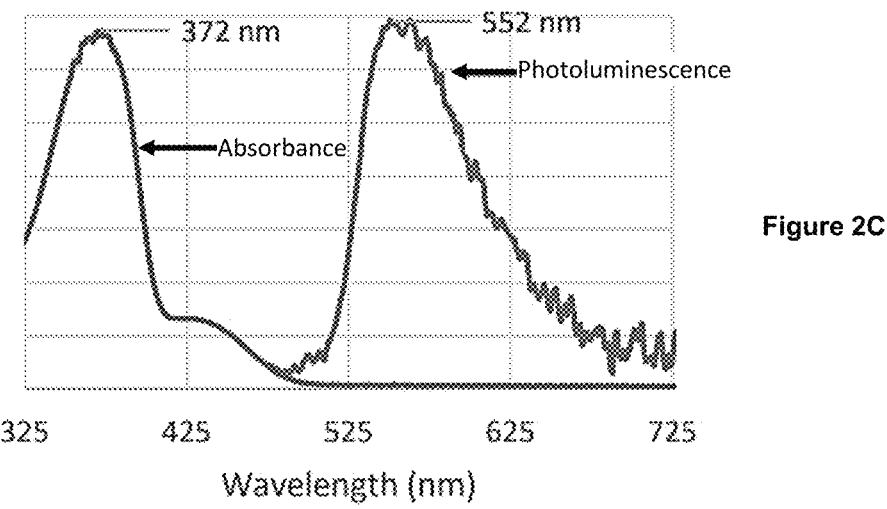
Figure 2C
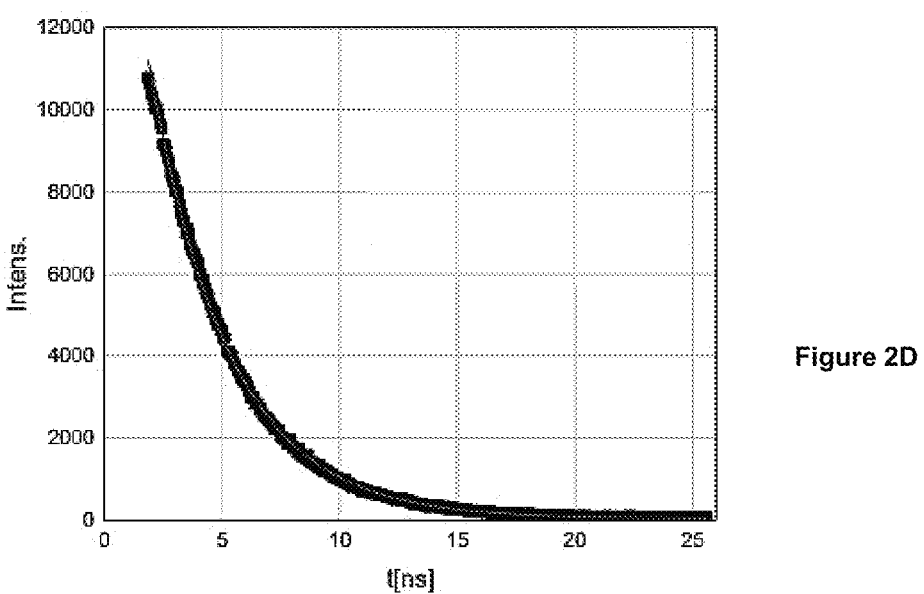
Figure 2D
|  | PLQY (450 nm) | PLQY (405 nm) |
|---|---|---|
| F8BT in epoxy (flat) | 88.2% | 81.5% |
| F8BT in epoxy (16mm sphere) | 72.1% | 72.0% |
| F8BT in epoxy (8mm sphere) | 63.6% | 72.5% |
| C545T in epoxy (flat) | 89.2% | 98.3% |
| C545T in epoxy (16mm sphere) | 70.0% | 71.0% |
| C545T in epoxy (8mm sphere) | 73.0% | 66.0% |
| DCQTB in epoxy (flat) | 59.8% | 57.3% |
| DCQTB in epoxy (16mm sphere) | 45.0% | 33.5% |
Figure 2E

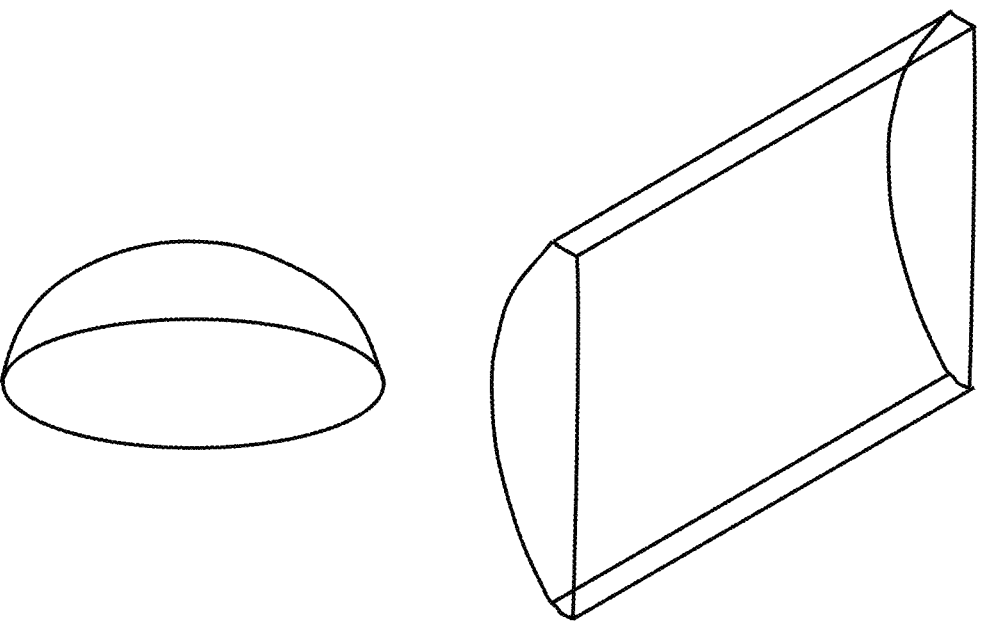
Figure 3A                    Figure 3B

OPTICAL DETECTION DEVICE, SYSTEM, AND METHOD FOR OMNIDIRECTIONAL PHOTODETECTION

TECHNICAL FIELD

Embodiments of the invention generally relate to optical detection using fluorescent lens which is capable of providing self-aligned emission to a photodetector, and enabling omnidirectional photodetection. Embodiments of the invention also relate to fabricating the fluorescent lens and optical detection system having the fluorescent lens.

BACKGROUND

In free-space optical wireless communications, optical alignment is a common issue due to narrow laser beam, e.g., less than 1° beam divergence, small active area of detectors or receivers, e.g. less than 1×1 mm², and long transmission distances. While a larger photodetector area may be provided, this results in slow detector response and is therefore unsuitable for free-space communications.

An existing solution requires complicated mechanical laser tracking system to align the beam. Another existing solution requires a large bulky optical lens to collect more signals over a larger distance. However, such collection optics have limited field-of-view of less than 70° half angle and this restricts the angles over which signals are collected. Yet another existing solution requires a sophisticated lens such as fish-eye lens to increase the field-of-view and collection efficiency of photodetector. This approach can be used for detection up to 180° of incident beam angle. While a fish-eye lens with wide acceptance angle may be used for detection of signals over 180°, this approach may be useful for beams with wide divergence such as LEDs but not as effective when lasers with narrow beams are used.

SUMMARY

According to an aspect of the invention, an optical detection device is provided which comprises:

a fluorescent lens having a light collecting area being a spherical, hemispherical, or cylindrical surface of the fluorescent lens, and a light outcoupling area; and a fluorophore dispersed throughout the light collecting area and the fluorescent lens, wherein the fluorophore is excitable by a light beam, which is incident at any position or angle in relation to the light collecting area, to produce a light emission, wherein the light outcoupling area is arranged to allow an extraction of the light emission from the fluorescent lens, wherein the light collecting area is larger than the light outcoupling area.

In an embodiment, the light outcoupling area includes a butt coupling, a scattering centre, a non-spherical surface, a non-hemispherical surface, or a non-cylindrical surface.

In an embodiment, the scattering centre includes a notch or a defect on the fluorescent lens.

In an embodiment, the non-spherical, the non-hemispherical, or non-cylindrical surface is a flat surface.

In an embodiment, the fluorescent lens includes a resin, and the fluorophore includes a down-conversion material for producing the light emission having a longer wavelength than the light beam, or an up-conversion material for producing the light emission having a shorter wavelength than the light beam.

In an embodiment of any aforesaid aspect, the fluorescent lens includes a dichroic mirror applied thereto.

In an embodiment of any aforesaid aspect, the fluorescent lens is configured to focus the light beam, which is incident on the spherical surface and unconverted by the fluorophore, on the light outcoupling area.

In an embodiment of any aforesaid aspect, the light beam is a laser light beam, a light emitting diode (LED) irradiation, or a light beam having a modulation frequency that is slower than a decay rate of the fluorophore.

In an aspect of the invention, an optical detection system is provided and comprises:

an optical device according to the aforesaid aspect and/or any embodiment; and a photodetector having a light detection area optically coupled to the light outcoupling area to receive the light emission, wherein the light collecting area of the fluorescent lens is larger than the light detection area of the photodetector.

In an embodiment, the light outcoupling area is smaller than or equal to the light detection area.

In an embodiment, a plane through the light outcoupling area and the light detection area is parallel to or co-planar with the light beam.

In an embodiment, a plane through the light outcoupling area and the light detection area is substantially orthogonal or orthogonal to the light beam.

In an aspect of the invention, an optical detection method is provided and comprises:

receiving a light beam incident at any position or angle in relation to the spherical surface of a fluorescent lens having a light collecting area being the spherical surface, and a light outcoupling area, wherein the fluorescent lens includes a fluorophore which is dispersed throughout the spherical surface and the fluorescent lens; and upon exciting the fluorophore by the light beam, producing a light emission and extracting the light emission through the light outcoupling area, wherein an area of the spherical surface is larger than the light outcoupling area.

In an embodiment, the method further comprises:

receiving, by a light detection area of a photodetector, the light emission wherein the light detection is optically coupled to the light outcoupling area, wherein the area of the spherical surface is larger than the light detection area.

In an embodiment, the light outcoupling area is smaller than or equal to the light detection area.

In an embodiment, a plane through the light outcoupling area and the light detection area is parallel to or co-planar with the light beam.

In an embodiment, a plane through the light outcoupling area and the light detection area is substantially orthogonal or orthogonal to the light beam.

In an embodiment, prior to receiving the light beam, the method comprises: rotating both the fluorescent lens and the photodetector by up to 90° if the light beam is incident at any angle on the photodetector and prevented by the photodetector from incidence on the spherical surface of the fluorescent lens.

In an embodiment, extracting the light emission through the light outcoupling area includes:

butt coupling the light emission;

scattering the light emission from a notch or a defect on the fluorescent lens; or extracting the light emission through a flat surface on the fluorescent lens.

In an embodiment, producing the light emission includes:
down-converting the light beam into the light emission having a longer wavelength than the light beam; or
up-converting the light beam into the light emission having a shorter wavelength than the light beam.

In an embodiment, prior to extracting the light emission through the light outcoupling area, the method further comprising:
reflecting, by a dichroic mirror applied to the spherical surface, the light emission towards the light outcoupling area.

In an embodiment, the method further comprises:
without exciting the fluorophore, focusing the light beam, which is unabsorbed by the fluorophore, on the light outcoupling area.

In an embodiment, the light beam is a laser light beam, a light emitting diode (LED) irradiation, or a light beam having a modulation frequency that is slower than the decay rate of the fluorophore.

BRIEF DESCRIPTION OF DRAWINGS

FIG. 1A shows an optical detection system according to an embodiment of the invention;

FIG. 1B is a schematic diagram showing an operation of the optical detection system of FIG. 1A;

FIG. 1C is a flowchart of describing an operation of the optical detection system of FIG. 1A;

FIGS. 1D and 1E are schematic diagrams showing an operation of the optical detection system of FIG. 1A;

FIG. 2A shows absorbance and photoluminescence spectra according to an embodiment;

FIG. 2B shows a schematic diagram of a set-up which provides the spectra of FIG. 2A;

FIG. 2C shows average lifetime of photoluminescence according to an embodiment;

FIG. 2D shows photoluminescence quantum yield (PLQY) of fluorescent lens fabricated from different fluorophores;

FIG. 2E shows transmittance of a 15 nm layer aluminium partial mirror according to an embodiment;

FIGS. 3A and 3B show alternative shapes for a fluorescent lens.

DETAILED DESCRIPTION

In the following description, numerous specific details are set forth in order to provide a thorough understanding of various illustrative embodiments of the invention. It will be understood, however, to one skilled in the art, that embodiments of the invention may be practiced without some or all of these specific details. In other instances, well known process operations have not been described in detail in order not to unnecessarily obscure pertinent aspects of embodiments being described. In the drawings, like reference numerals refer to same or similar functionalities or features throughout the several views.

Embodiments described in the context of one of the methods, devices, systems may be analogously valid for the other methods, devices, systems. Similarly, embodiments described in the context of a method are analogously valid for a device or system, and vice versa. Similarly, features and their additions, combinations and/or alternatives that are described in the context of an embodiment may correspondingly be applicable to the same or similar features in the other embodiments even if not explicitly described in these other embodiments.

In the context of various embodiments, including examples and claims, the articles "a", "an" and "the" as used with regard to a feature or element include a reference to one or more of the features or elements. The terms "comprising," "including," and "having" are intended to be open-ended and mean that there may be additional features or elements other than the listed ones. The term "and/or" includes any and all combinations of one or more of the associated listed items. Identifiers such as "first", "second" and so on, are used merely as labels, and are not intended to impose numerical requirements on their objects, nor construed in a manner imposing any relative position or time sequence between limitations. The term "coupled" and related terms are used in an operational sense and are not necessarily limited to a direct physical connection or coupling. Thus, for example, two devices may be coupled directly, or via one or more intermediary devices. Based on the present disclosure, a person of ordinary skill in the art will appreciate a variety of ways in which coupling exists in accordance with the aforementioned definition.

The term "sphere" and related terms may refer to a full sphere, a substantially full sphere, a near-sphere, a hemi-sphere, a sphere-like structure. The terms "sphere" and "ball" may be interchangeably used. The term "spherical surface" and related terms may refer to full, substantial, half, or part of the surface of a sphere or part thereof. The term "uniform" and related terms may refer to fully uniform or substantially uniform.

Embodiments of the invention provide an optical detection device which comprises a fluorescent lens having a light collection area and a light outcoupling area wherein the light collection area is substantially larger than the light outcoupling area. Embodiments of the invention further provide an optical system which comprises an optical detection device and a photodetector which is optically coupled thereto. Embodiments of the invention further provide a method in which a fluorescent lens is excited by a light beam incident thereon; the fluorescent lens produces a visible light emission (e.g. glows due to photoluminescence), the visible light emission is internally reflected within the fluorescent lens, and the internally-reflected light emission is outcoupled or extracted through the light outcoupling area to be provided to a photodetector, in particular to its active area or light detection area.

FIG. 1A shows an optical detection system according to an embodiment of the invention.

The fluorescent lens 10 includes an optically transparent sphere or ball 12, and a fluorophore 14. The spherical structure 12 provides a wide angle and area for light collection. The fluorophore 14 is uniformly dispersed or embedded throughout the sphere 12, including the spherical surface and within the sphere 12. A light collection area 16 may be provided by the spherical surface of the sphere 12. A light outcoupling area 18 may be configured to preferentially couple light into a photodetector. The light outcoupling area may be provided by a butt coupling (i.e. without using any type of intermediary object, lens or other focusing element), a scattering centre (e.g. notch or defect on the spherical surface), or a non-spherical surface (e.g. flat surface formed on the spherical surface). The spherical surface may be substantially equal to or equal to an entire surface of a sphere, or substantially equivalent to or larger than a surface of a hemisphere. The light collection area 16 of the fluorescent ball lens 10 may be substantially larger than (e.g. multiple times larger than) the light outcoupling area 18 of fluorescent ball lens 10 and/or the light detection area 52 of the photodetector 50.

The fluorescent ball lens 10 is optically coupled to the photodetector 50. Particularly, the light outcoupling area 18 of the fluorescent ball lens 10 is optically coupled to a light detection area 52 of the photodetector 50. For example, for maximum collection of light, the light outcoupling area 18 may be optically aligned to the light detection area 52 of the photodetector 50. Optical alignment may include a juxtaposed, an adjacent, or a proximate arrangement of the light outcoupling area 18 relative to the light detection area 52. Furthermore, the light outcoupling area 18 of the fluorescent ball lens 10 may be made smaller than or equal to the light detection area 52 of the photodetector 50 so that all the emitted light from the light outcoupling area 18 can be collected in the photodetector 50. Alternatively, the light outcoupling area 18 of the fluorescent ball lens 10 may be made larger than the light detection area 52 of the photodetector 50.

The sphere 12 includes a resin (e.g. bisphenol A diglycidyl ether). The fluorophore 14 includes a down-conversion material which is configured, upon excitation, to produce a visible light emission having a longer wavelength than the incident light beam, or an up-conversion material which is configured, upon excitation, to produce a visible light emission having a shorter wavelength than the incident light beam. Examples of down-conversion materials include organic dyes, quantum dots (e.g. indium phosphide (InP), copper indium sulfide (CIS)) dispersed in resin (e.g. Bisphenol A Diglycidyl Ether Epoxy Resin). An example of up-conversion materials includes lanthanide.

In some applications (e.g. optical communication system) light is modulated at high frequency, therefore fast response of the fluorescent material is important, hence the carrier lifetime of fluorescent material is preferably faster than the modulation speed of light source in order to be detected. In some examples, the optical detection device may be capable of detecting light that has very high modulation frequencies of up to about 285 MHz due to the fast carrier lifetime of the fluorescent material <3.5 ns.

The light beam may be a laser light beam, a light emitting diode (LED) irradiation, a light beam having a modulation frequency that is slower than the decay rate of the fluorophore, or a light beam from other light source that has sufficiently high intensity to generate a sufficiently high signal-to-noise ratio.

The spherical surface may be coated with a dichroic or partial mirror to reflect the visible light emission back into the photodetector 50 to improve signal intensity or strength. An example of coating material includes aluminium.

FIG. 1B is a schematic diagram showing an operation of the optical detection system of FIG. 1A which will be described with reference to the flowchart of FIG. 1C.

In block 102, the fluorescent lens 10 receives at least a light beam 5 incident on the light collection area 16 being the spherical surface of the fluorescent lens 10. The incident light beam 5 may be received at any position on the spherical surface and in any direction in relation to the spherical surface. The light beam 5 may be visible or invisible to human eye.

In block 104, upon excitation by the received light beam 5, the fluorophore 12 of the fluorescent lens 10 produces a visible light emission. In other words, the light beam 5 is at least partially converted into a visible light emission.

In block 106, the fluorescent lens 10 internally reflects the produced visible light emission within the fluorescent lens 10. Multiple internal reflections may be produced and trapped within the fluorescent lens 10. Optionally, a dichroic mirror applied to the spherical surface reflects the produced and/or reflected visible light emission to the light outcoupling area 18.

In block 108, a visible light emission is extracted through the light outcoupling area 18. In particular, after internal reflections, one of the reflected visible light emissions is incident on the light outcoupling area 18.

In block 110, the extracted light emission enters the light detection area 52 of the photodetector 50 which is optically coupled to the light outcoupling area 18 of the fluorescent lens 10, thereby preferentially coupling into the photodetector 50 and providing self-alignment of the light emission into the photodetector 50.

It is to be appreciated that the incident light beam may be partially unconverted or unabsorbed by the fluorophore. The fluorescent lens 10 may focus the unconverted light beam on the light outcoupling area 18 without requiring internal reflection. The unconverted light beam is thereby extracted through the light outcoupling area 18. The extracted light beam may enter the light detection area 52 of the photodetector 50, and thereby be coupled into the photodetector 50.

FIGS. 1D and 1E are schematic diagrams showing an operation of the optical detection system of FIG. 1A, wherein the light outcoupling area 18 and light detection area 52 are arranged along a same plane (hereinafter "first plane"). In FIG. 1D, a light beam 5 which is provided 90°, orthogonal or substantially orthogonal to the first plane and incident on the fluorescent lens 10 can be detected by the optical system. In FIG. 1D, as the light beam 5 along the first plane is unblocked by the photodetector 50, it can be detected. In FIG. 1E, as the light beam 5 is provided along, parallel or co-planar to the first plane and blocked by the photodetector 50, the light beam 5 cannot be incident on the fluorescent lens 10 and hence cannot be detected by the optical system. To facilitate detection, the optical detection system of FIG. 1E may be rotated by up to 90°, e.g. from the arrangement of FIG. 1E to the arrangement in FIG. 1D, so that the light beam 5 is incident on the fluorescent lens 10. Alternatively, other angles of rotation may allow the light beam 5 to be incident on the fluorescent lens 10 and thereby facilitate detection.

A method for fabricating an optical detection device may be described as follows.

A first reagent having a fluorophore (e.g. F8BT Organic Emitter or other substitutes such as C545T, DCQTB), a second reagent having an epoxy resin (e.g. Bisphenol A Diglycidyl Ether (BADGE)), and a third reagent having a curing agent (e.g. Isophorone Diamine (IPDA)) are mixed to produce a mixture. The reagents may be provided in a predetermined or stoichiometric ratio. The mixture may undergo centrifuging and degassing.

The mixture is dispensed into a suitable mold to cast into the desired shape.

The mixture is thermally cured to produce a fluorescent molded article.

The fluorescent molded lens is removed from the mold.

A notch, a defect or a non-spherical or non-curved surface, e.g. flat surface, is formed on the fluorescent molded lens to provide the light outcoupling area.

A dichroic mirror is applied to the spherical surface. This may be achieved by rotating the fluorescent lens and performing physical vapour deposition or sputtering in the spherical surface during the rotation.

A method for fabricating an optical detection system may include optically coupling a light outcoupling area of a fluorescent ball lens to a light detection area of a photodetector. Examples include butt coupling the light outcoupling area to the light detection area; optically coupling the notch or the defect to the light detection area; or optically coupling the flat surface to the light detection area.

An implementation set-up corresponding to FIG. 1A was employed to detect a 405 nm laser beam from a distance of 8 m. An optical device (fluorescent ball lens) as described herein was mounted on a photodetector and exited by a 405 nm laser beam. It was observed that light emitted from the fluorescent ball lens was self-aligned into the photodetector regardless of angle and direction of the incident laser beam. Detection at high modulation speed of 140 MHz was achieved due to fast switching speed of the fluorescent dye.

Using a similar implementation, the optical device (fluorescent ball lens) is mounted on an avalanche photodiode (APD) of a photodetector which is rotatably mounted on a stage to allow 360-degree rotation with respect to an incoming light bean. It was observed that signal intensity is independent of incident beam angle. This is evident from FIG. 2A which shows signal intensity as a function of incident laser beam angle as shown by an arrow in FIG. 2B showing a schematic diagram of the set-up. Accordingly, the optical detection system is able to achieve omnidirectional detection which is particularly effective for laser communications wherein beam spread is small and the full beam can be captured by the sphere from all different incident angles.

Performance evaluation was carried out using a fluorescent ball lens having F8BT organic emitter embedded in epoxy resin. FIG. 2A shows absorbance and photoluminescence (at 405 nm excitation) spectra. It is observed that reabsorption is low as there is little spectral overlap between the absorbance and photoluminescence spectra. FIG. 2C shows average lifetime is estimated to be 3.35 ns via time resolved photoluminescence (TRPL). This enables fast photodetection of laser modulation.

Performance evaluation was also carried out using fluorescent ball lens of different fluorophores, e.g. F8BT, C545T, and DCQTB, with 450 nm and 400 nm laser excitation. FIG. 2D shows photoluminescence quantum yield (PLQY) of fluorescent ball lens fabricated from different fluorophores. Both F8BYT and C545T spheres show a high photoluminescence quantum yield of more than 70% at peak emission of 552 nm and 545 nm respectively. This means 70% of the incident blue light is converted to yellow emission. A red DCQTB sphere has a longer peak wavelength of 648 nm but a lower PLQY of 45%. This is important for achieving high conversion efficiency from blue to yellow emission for high sensitivity photodetection, where responsivity of silicon photodetector is higher. To improve the sensitivity, spherical surface may be coated to trap most of the emitted light within the sphere, rather than being emitted out of the sphere. A partial mirror created by 15 nm aluminium is able to preferentially transmit blue light and trap most of the emitted light in sphere. This is evident from FIG. 2E which shows transmittance of a 15 nm layer aluminium partial mirror.

FIGS. 3A and 3B show alternative shapes for the fluorescent lens. As the description relating to the fluorescent ball lens is applicable, with suitable modifications, to the lens of FIGS. 3A and 3B, it will not be repeated. As FIG. 3A shows a hemispherical lens having a half-spherical surface and a non-spherical surface, previous description references to "sphere" and "spherical surface" may refer to hemisphere and hemispherical surface, respectively, of FIG. 3A; while previous description references to "non-spherical surface" may refer to non-hemispherical surface of FIG. 3A. As FIG. 3B shows a cylindrical lens having at least a curved or circular surface and one or more non-curved or flat surfaces, previous description references to "sphere" and "spherical surface" may refer to cylinder and cylindrical surface, respectively, of FIG. 3B; while previous description references to "non-spherical surface" may refer to non-curved or flat surface of FIG. 3B.

Embodiments of the invention provide at least the following features and/or technical advantages, and are useful in applications including but not limited to long range optical communication and laser tracking.

The fluorescent ball lens structure enables an omnidirectional (360°) photodetector which is independent of distance, beam focus and incident angle of a light beam source. In particular, the ball lens structure enables light collection from a wide range of directions and angles (e.g. 0° to) 360° when the light beam is fully captured by the fluorescent ball lens, and also from multiple light beam sources whether they are focused or defocused. Other lens shapes as contemplated herein also enable light collection from a wide range of directions and angles.

Due to a ratio of light collection area of the fluorescent lens and a light detection area of the photodetector (i.e., the light collection area of the fluorescent ball lens is larger than a light detection area of the photodetector), the light detection area is effectively equivalent to the spherical, hemispherical, or cylindrical surface of the fluorescent ball lens, or part thereof. This enables the optical detection system to achieve high sensitivity and fast photodetection. In an example wherein an active area of the photodetector is about $0.002 \text{ cm}^2$ and diameter of the fluorescent ball lens is 16 mm, the active area or light detection area of the photodetector may be increased from about $0.002 \text{ cm}^2$ to about $2 \text{ cm}^2$ without reducing response time of the photodetector. Other examples in which the dimensions and/or ratio of light detection area and diameter of the fluorescent lens are different are also possible. In various examples, increased area of detection may be ascertained or estimated based on the surface area of the lens less the light outcoupling area, e.g., truncated portion of the lens which provides the light outcoupling area.

Provision of a small light outcoupling area of the fluorescent lens which may be substantially equal to or smaller than the light detection area of the photodetector enables self-alignment emission into the photodetector.

Signal intensity can be improved by coating the surface of the fluorescent lens with a partial mirror to reflect the light emission back into the photodetector. This enables easy alignment of light beam over a long distance (as far as human eye can see) and also allow multiple sources of laser from a wide range of angles to a single photodetector.

The use of down-conversion fluorophore to down-convert incident light beam into longer wavelength emission enables higher responsivity in the photodetector. The light emission can also preferentially couple into the photodetector. In this way, light beam coming from 360° directions can be detected without critical alignment.

The use of up-conversion fluorophore to up-convert incident light beam into shorter wavelength emission enables invisible infrared light to be detected.

Due to fast decay time of the fluorescence of the dye (e.g., in the order of nanoseconds, light beams or signals could be modulated to higher frequencies).

Other embodiments will be apparent to those skilled in the art from consideration of the specification and practice of the disclosure. Furthermore, certain terminology has been used for the purposes of descriptive clarity, and not to limit the disclosed embodiments. The embodiments and features described above should be considered exemplary.

The invention claimed is:

1. An optical detection device comprises:

a fluorescent lens having a light collecting area being a spherical, hemispherical, or cylindrical surface of the fluorescent lens, and a light outcoupling area; and a fluorophore dispersed throughout the light collecting area and the fluorescent lens, wherein the fluorophore is excitable by a light beam, which is incident at any position or angle in relation to the light collecting area, to produce a light emission, wherein the light outcoupling area is arranged to allow an extraction of the light emission from the fluorescent lens, wherein the light collecting area is larger than the light outcoupling area.

2. The optical detection device according to claim 1, wherein the light outcoupling area includes a butt coupling, a scattering centre, a non-spherical surface, a non-hemispherical surface, or a non-cylindrical surface.

3. The optical detection device according to claim 2, wherein the scattering centre includes a notch or a defect on the fluorescent lens.

4. The optical detection device according to claim 2, wherein the non-spherical surface, the non-hemispherical surface, or the non-cylindrical surface is a flat surface.

5. The optical detection device according to claim 1, wherein the fluorescent lens includes a resin, and the fluorophore includes a down-conversion material for producing the light emission having a longer wavelength than the light beam, or an up-conversion material for producing the light emission having a shorter wavelength than the light beam.

6. The optical detection device according to claim 1, wherein the fluorescent lens includes a dichroic mirror applied thereto.

7. The optical detection device according to claim 1, wherein the fluorescent lens is configured to focus the light beam, which is unabsorbed by the fluorophore, on the light outcoupling area.

8. The optical detection device according to claim 1, wherein the beam is a laser light beam, a light emitting diode (LED) irradiation, or a light beam having a modulation frequency that is slower than a decay rate of the fluorophore.

9. An optical detection system comprising:

the optical detection device according to claim 1; and a photodetector having a light detection area optically coupled to the light outcoupling area to receive the light emission, wherein the light collecting area of the fluorescent lens is larger than the light detection area of the photodetector.

10. The optical detection system of claim 9, wherein the light outcoupling area is smaller than or equal to the light detection area.

11. The optical detection system of claim 9, wherein a plane through the light outcoupling area and the light detection area is parallel to or co-planar with the light beam.

12. The optical detection system of claim 9, wherein a plane through the light outcoupling area and the light detection area is substantially orthogonal or orthogonal to the light beam.

13. An optical detection method comprising:

receiving a light beam incident at any position or angle in relation to a spherical surface of a fluorescent lens having a light collecting area being the spherical surface, and a light outcoupling area, wherein the fluorescent lens includes a fluorophore which is dispersed throughout the spherical surface and the fluorescent lens; and upon exciting the fluorophore by the light beam, producing a light emission and extracting the light emission through the light outcoupling area, wherein an area of the spherical surface is larger than the light outcoupling area.

14. The optical detection method according to claim 13, further comprising:

receiving, by a light detection area of a photodetector, the light emission wherein the light detection is optically coupled to the light outcoupling area, wherein the area of the spherical surface is larger than the light detection area.

15. The optical detection method of claim 14, wherein the light outcoupling area is smaller than or equal to the light detection area.

16. The optical detection method of claim 14, wherein a plane through the light outcoupling area and the light detection area is parallel to or co-planar with the light beam.

17. The optical detection method of claim 14, wherein a plane through the light outcoupling area and the light detection area is substantially orthogonal or orthogonal to the light beam.

18. The optical detection method according to claim 14, wherein prior to receiving the light beam, the method further comprising:

rotating both the fluorescent lens and the photodetector by up to 90° if the light beam is incident at any angle on the photodetector and prevented by the photodetector from incidence on the spherical surface of the fluorescent lens.

19. The optical detection method according to claim 13, wherein extracting the light emission through the light outcoupling area includes:

butt coupling the light emission;

scattering the light emission from a notch or a defect on the fluorescent lens; or extracting the light emission through a flat surface on the fluorescent lens.

20. The optical detection method according to claim 13, wherein producing the light emission includes:

down-converting the light beam into the light emission having a longer wavelength than the light beam; or up-converting the light beam into the light emission having a shorter wavelength than the light beam.

21. The optical detection method according to claim 13, wherein prior to extracting the light emission through the light outcoupling area, the method further comprising:

reflecting, by a dichroic mirror applied to the spherical surface, the light emission to the light outcoupling area.

22. The optical detection method according to claim 13, further comprising:

without exciting the fluorophore, focusing the light beam, which is unabsorbed by the fluorophore, on the light outcoupling area.

23. The optical detection method according to claim 13, wherein the light beam is a laser light beam, a light emitting diode (LED) irradiation, or a light beam having a modulation frequency that is slower than the decay rate of the fluorophore.

* * * * *